(12) United States Patent
Sun

(10) Patent No.: US 8,611,081 B2
(45) Date of Patent: Dec. 17, 2013

(54) FOLDABLE FIXING APPARATUS FOR HARD DISK DRIVE

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 242 days.

(21) Appl. No.: 13/198,731

(22) Filed: Aug. 5, 2011

(65) Prior Publication Data

US 2012/0267500 A1 Oct. 25, 2012

(30) Foreign Application Priority Data

Apr. 22, 2011 (CN) .......................... 2011 1 0102167

(51) Int. Cl.
*H05K 5/00* (2006.01)
(52) U.S. Cl.
USPC .............. 361/679.33; 248/222.11; 248/316.5; 361/679.58
(58) Field of Classification Search
USPC ............. 248/309.1, 27.1, 271, 316.5, 222.11, 248/918; 361/724, 748, 756, 759, 679.01, 361/679.33, 679.37, 679, 685, 679.59, 361/679.58, 797, 801; 439/64, 377; 312/332.1
See application file for complete search history.

(56) References Cited

U.S. PATENT DOCUMENTS

| | | | | |
|---|---|---|---|---|
| 3,959,995 A | * | 6/1976 | Fletcher | 70/18 |
| 5,076,531 A | * | 12/1991 | Delaney | 292/281 |
| 6,012,739 A | * | 1/2000 | Weiss et al. | 280/814 |
| 6,038,131 A | * | 3/2000 | Valosen et al. | 361/756 |
| 2008/0084673 A1 | * | 4/2008 | Hsiung | 361/724 |
| 2012/0236511 A1 | * | 9/2012 | Shu | 361/748 |
| 2012/0267500 A1 | * | 10/2012 | Sun | 248/309.1 |
| 2012/0273639 A1 | * | 11/2012 | Sun | 248/309.1 |

* cited by examiner

*Primary Examiner* — Tan Le
(74) *Attorney, Agent, or Firm* — Altis Law Group, Inc.

(57) ABSTRACT

A foldable fixing apparatus for fixing a hard disk drive includes a handle and two collapsible arms. The handle includes a sidewall. Each collapsible arm includes a fixing arm and a pivot arm. First ends of the fixing arms are rotatably connected to opposite ends of the sidewall. The pivot arms are rotatably connected to second ends of the fixing arms opposite to the first ends. When the pivot arms are pivoted to fold to the corresponding fixing arms, the collapsible arms are capable of being folded to the handle. When the fixing arms are rotated to be perpendicular to the sidewall of the handle, and the pivot arms are unfolded from, and aligned with, the corresponding fixing arms, the hard disk drive is capable of being mounted between the collapsible arms.

11 Claims, 9 Drawing Sheets

FOLDABLE FIXING APPARATUS FOR HARD DISK DRIVE

BACKGROUND

1. Technical Field

The present disclosure relates to a foldable apparatus for fixing a hard disk drive.

2. Description of Related Art

Many hard disk drives are fixed to a fixing frame with a number of screws, and then are installed in a bracket of a chassis together with the fixing frame. However, the fixing frame generally occupies large space when packaged or not in use, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
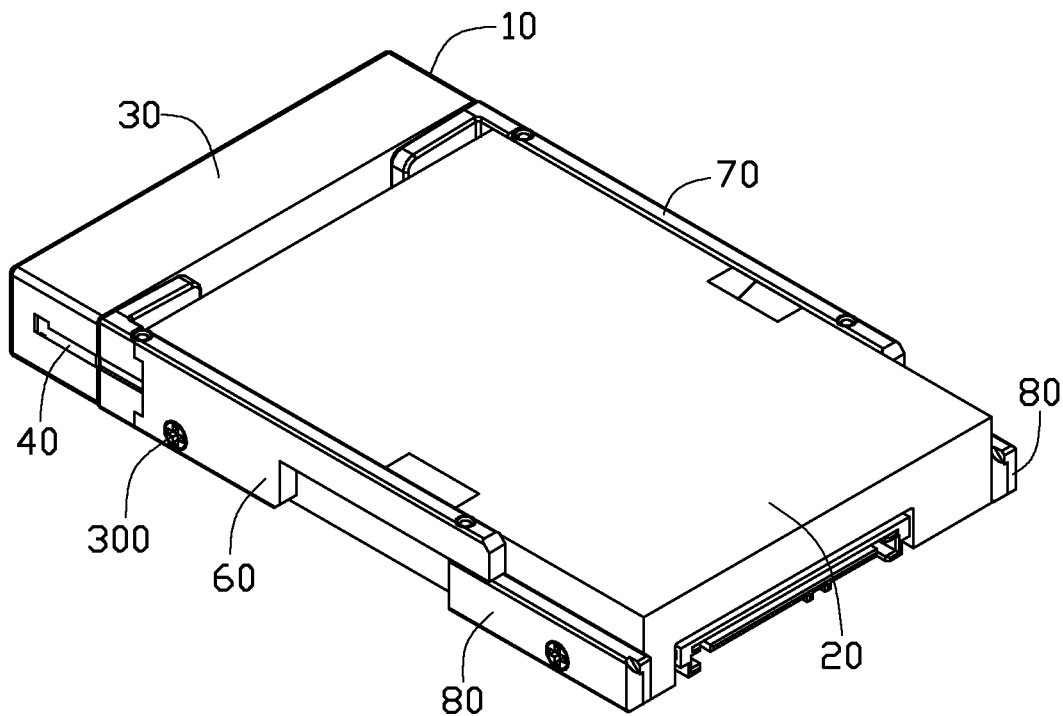
FIG. 1 is an assembled, isometric view of an exemplary embodiment of a foldable fixing apparatus together with a hard disk drive.
Figure 2:
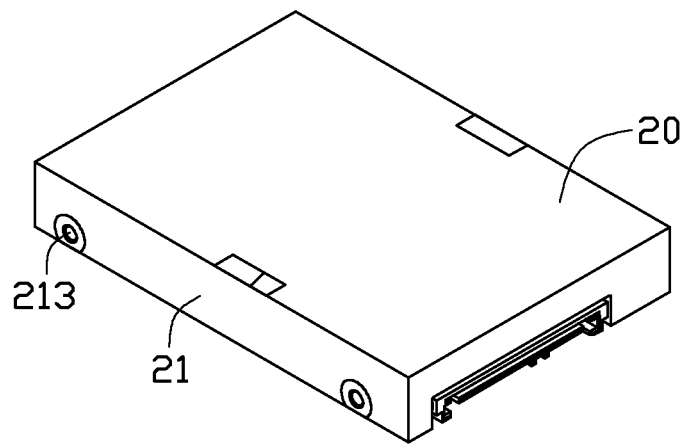
FIG. 2 is an exploded, isometric view of FIG. 1.
Figure 2:
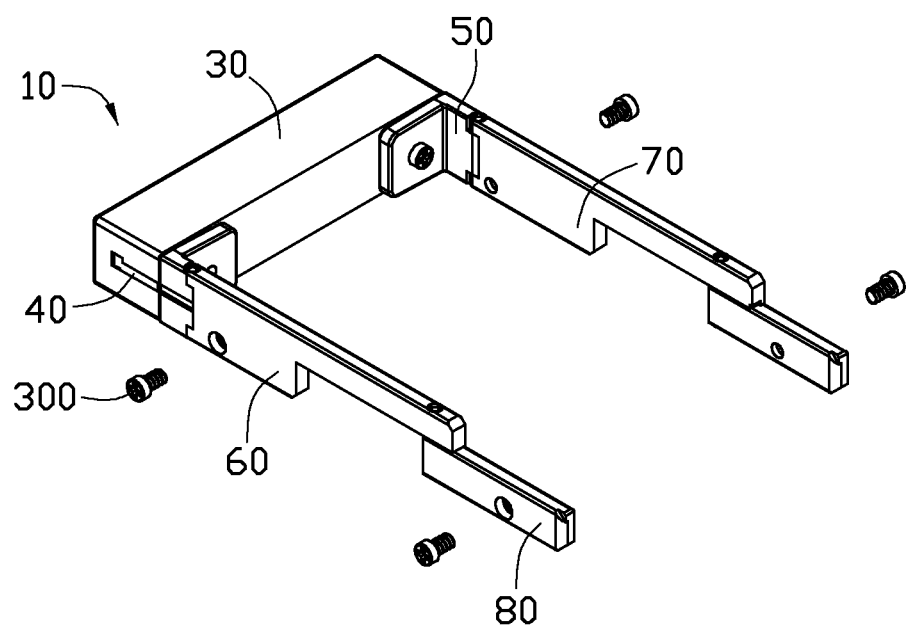
Figure 3:
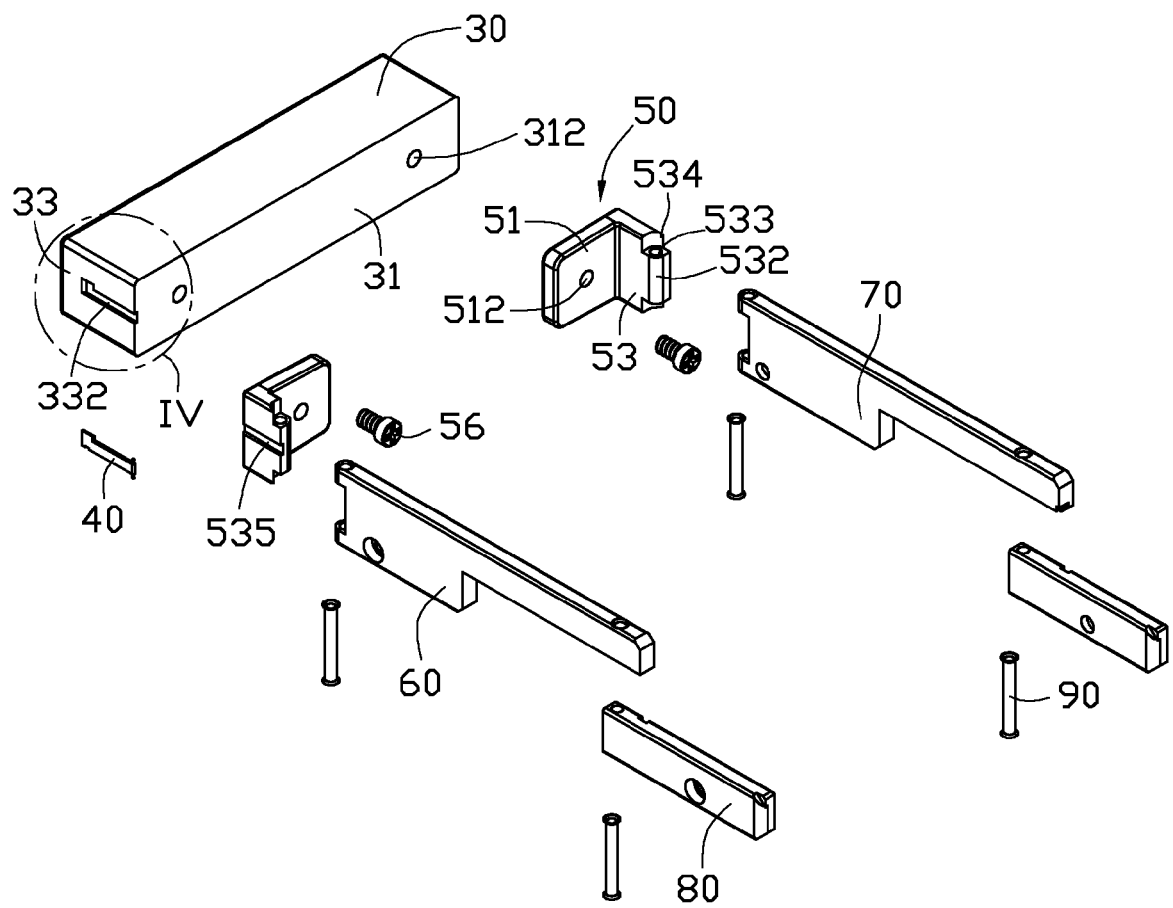
FIG. 3 is an exploded, isometric view of the fixing apparatus of FIG. 2, the fixing apparatus includes a handle, a latch, two fixing members, a first fixing arm, a second fixing arm, two pivot arms, and four pins.

Referring to FIGS. 1 to 3, an exemplary embodiment of a fixing apparatus 10 is provided to fix a hard disk drive 20. The hard disk drive 20 includes two opposite sidewalls 21. Two spaced fixing holes 213 are defined in each sidewall 21. The fixing apparatus 10 includes a handle 30, a latch 40, two fixing members 50, a first collapsible arm, and a second collapsible arm. The first collapsible arm includes a first fixing arm 60 and a pivot arm 80. The second collapsible arm includes a second fixing arm 70 and a pivot arm 80.

Figure 4:
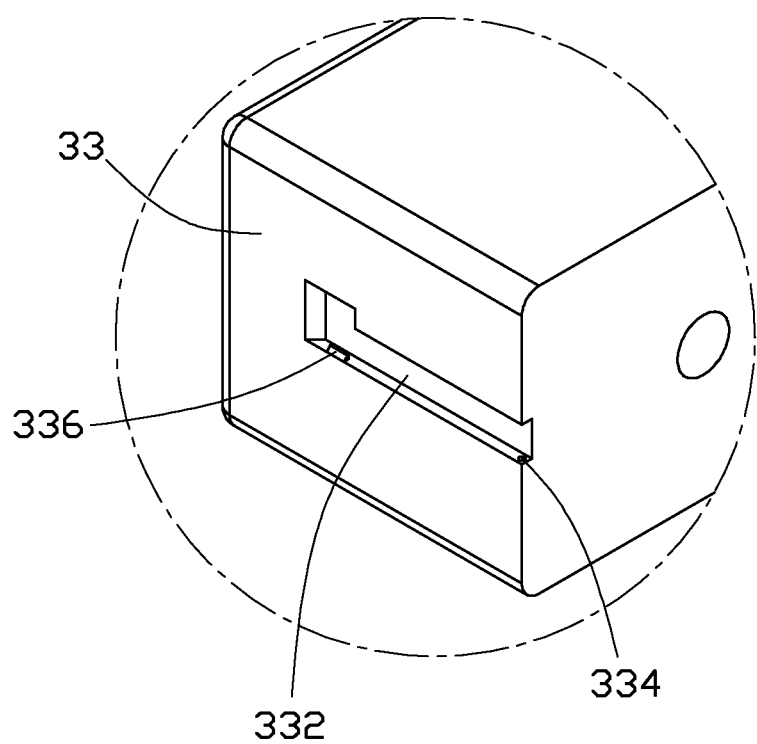
FIG. 4 is an enlarged view of a circled portion IV of FIG. 3.

Referring to FIG. 4, the handle 30 includes a sidewall 31, and two end walls 33 perpendicularly extending from opposite ends of the sidewall 31. Two threaded holes 312 are defined in the sidewall 31 respectively adjacent to the end walls 33. A first recess 332 is defined in one of the end walls 33, with an end of the first recess 332 extending through the sidewall 31. Top and bottom walls of the first recess 332 each define a pivot hole 334 adjacent to the sidewall 31. A block 336 protrudes from the bottom wall of the first recess 332, away from the sidewall 31.

Figure 5:
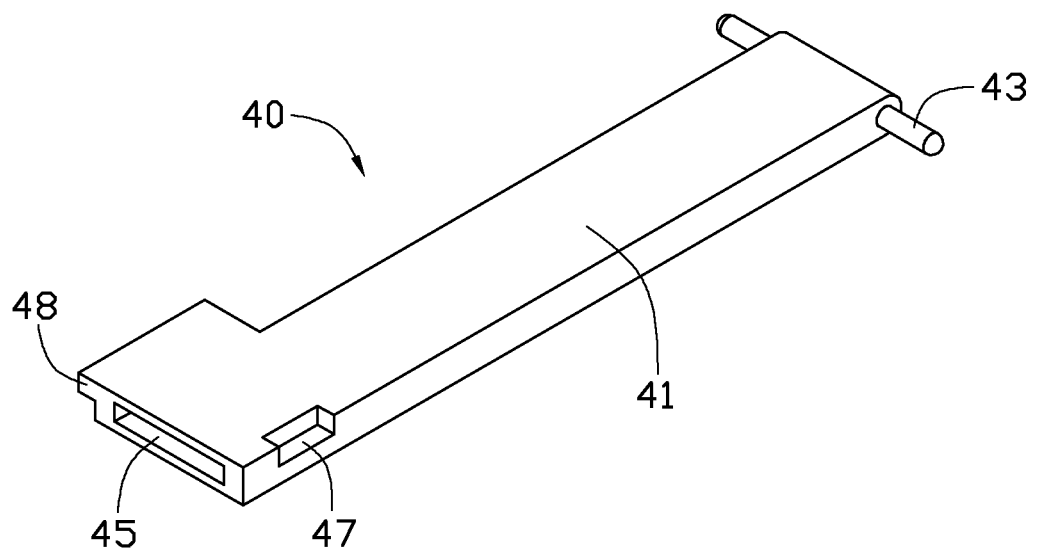
FIG. 5 is an enlarged, perspective view of the latch of FIG. 3.

Referring to FIG. 5, the latch 40 includes an elongated plate 41. Two pivots 43 protrude from a first end of the plate 41, away from each other. A slot 45 is defined in a second end of the plate 41 opposite to the first end. A hooking slot 47 is defined in a bottom of a side of the plate 41 adjacent to the second end, and a latching portion 48 protrudes from a top of the side of the plate 41 adjacent to the second end.

Referring to FIG. 3, each fixing member 50 is substantially L-shaped, and includes a first fixing portion 51 and a second fixing portion 53 perpendicular to the first fixing portion 51. A through hole 512 is defined in the first fixing portion 51. A pivot portion 532 protrudes from an end of the second fixing portion 53 away from the first fixing portion 51. A through hole 533 is longitudinally defined in the pivot portion 532. Two stop plates 534 are formed on the second fixing portion 53, respectively above and below the pivot portion 532. The stop plates 534 are connected to an outer surface of the second fixing portion 53. A second recess 535 is defined in the outer surface of the second fixing portion 53 of one of the fixing members 50, with two ends of the second recess 535 respectively extending through opposite ends of the second fixing portion 53.

Figure 6:
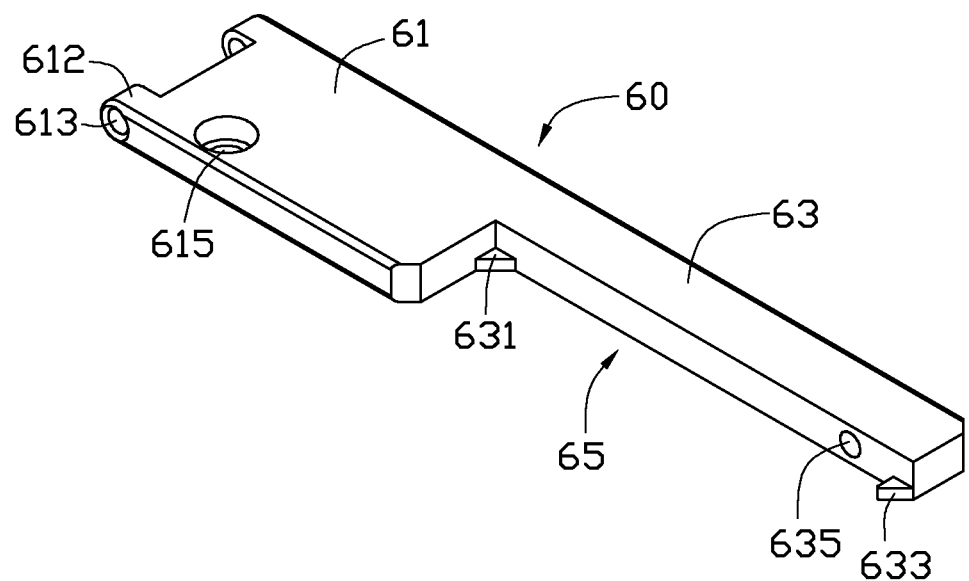
FIG. 6 is an enlarged, perspective view of the first fixing arm of FIG. 3.

Referring to FIG. 6, the first fixing arm 60 is substantially L-shaped, and includes a main body 61, and an extension arm 63 extending from an upper portion of a first end of the main body 61 and coplanar with the main body 61. The main body 61 and the extension arm 63 bound a receiving space 65. Two spaced protrusions 612 extend from a second end of the main body 61 away from the extension arm 63. A first pivot hole 613 is defined in each protrusion 612. A through hole 615 is defined in the main body 61, with two ends of the through hole 615 extending through inner and outer sides of the main body 61. A first tab 633 extends down from an inner side of a bottom of the extension arm 63 away from the main body 61, and a second tab 631 extends down from the inner side of the bottom of the extension arm 63 adjoining the main body 61. A second pivot hole 635 is defined in the extension arm 63 adjacent to the first tab 633, extending through a top and the bottom of the extension arm 63.

Figure 7:
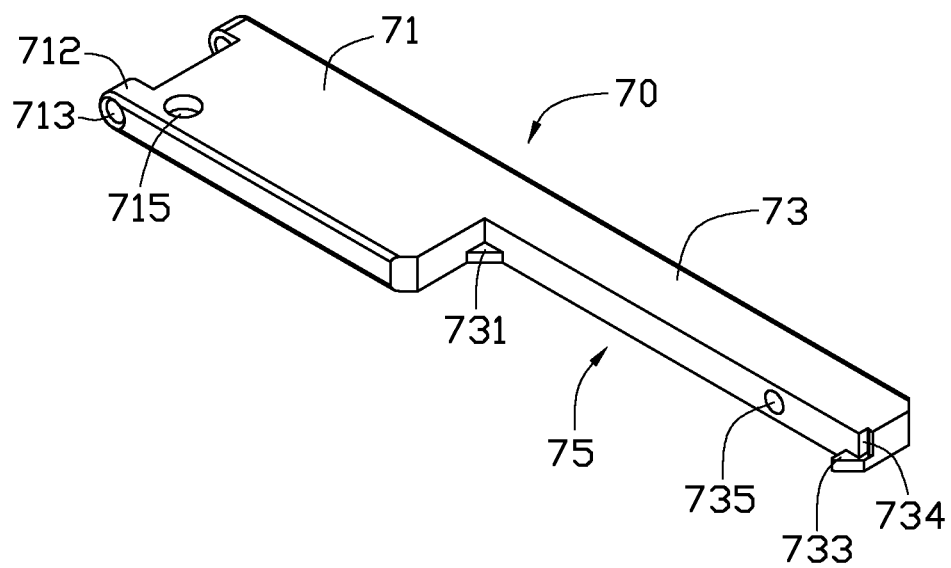
FIG. 7 is an enlarged, perspective view of the second fixing arm of FIG. 3.

Referring to FIG. 7, the second fixing arm 70 is substantially L-shaped, and includes a main body 71, and an extension arm 73 extending from an upper portion of a first end of the main body 71 and coplanar with the main body 71. The main body 71 and the extension arm 73 bound a receiving space 75. Two spaced protrusions 712 extend from a second end of the main body 71 away from the extension arm 73. A first pivot hole 713 is defined in each protrusion 712. A through hole 715 is defined in the main body 71, with two ends of the through hole 715 extending through inner and outer sides of the main body 71. A first tab 733 extends down from an outer side of a bottom of the extension arm 73 away from the main body 71, and a second tab 731 extends down from the outer side of the bottom of the extension arm 73 adjoining the main body 71. A latching slot 734 is defined in an inner side of an end of the extension arm 73 away from the main body 71. A second pivot hole 735 is defined in the extension arm 73 adjacent to the first tab 733, extending through a top and the bottom of the extension arm 73.

Figure 8:
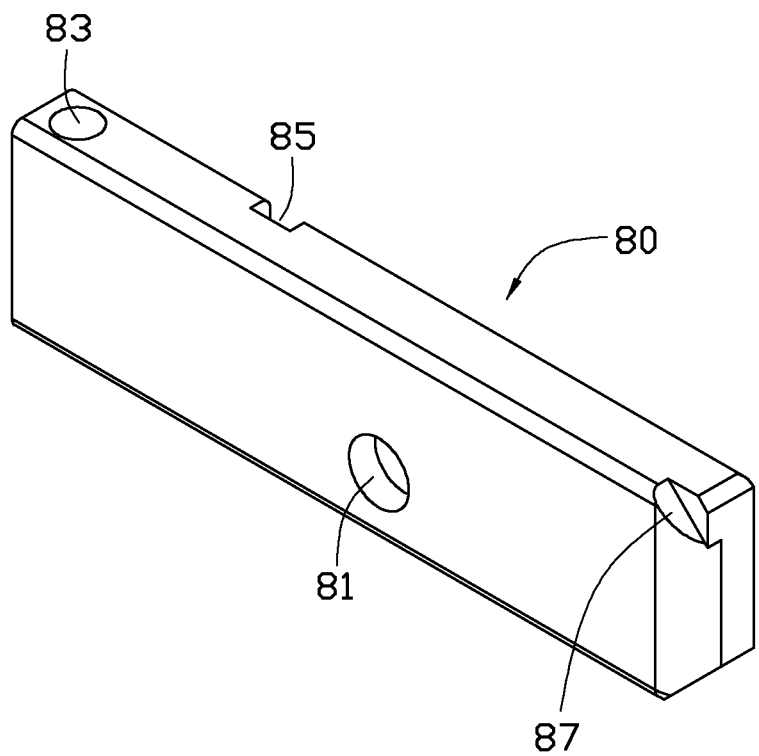
FIG. 8 is an enlarged, perspective view of one of the pivot arms of FIG. 3.

Referring to FIG. 8, each pivot arm 80 is substantially rectangular. A through hole 81 is defined in a middle of the pivot arm 80. A through hole 83 is defined in an end of the pivot arm 80, extending through a top and a bottom of the pivot arm 80. A first notch 85 is defined in a top of a side of the pivot arm 80 adjacent to the through hole 83. A second notch 87 is defined in a top of an opposite side of the pivot arm 80 away from the through hole 83.

Referring to FIG. 1, to assemble the fixing apparatus 10, the pivots 43 of the latch 40 are inserted into the corresponding pivot holes 334 of the handle 30, to allow the latch 40 to be rotatably connected to the first recess 332 of the handle 30. Two screws 56 are respectively extended through the through holes 512 of the fixing members 50, and engage in the corresponding threaded holes 312 of the handle 30, to respectively fix the fixing members 50 to opposite ends of the sidewall 31 of the handle 30. The outer surfaces of the second fixing portions 53 of the fixing members 50 are coplanar with the corresponding end walls 33 of the handle 30, and the second recess 535 of one of the fixing members 50 is in communication with the first recess 332.

The pivot portion 532 of the fixing member 50 having the second recess 535 is inserted into a space between the protrusions 612 of the first fixing arm 60. A pin 90 is extended through the first pivot holes 613 and the through hole 533, to rotatably connect the first fixing arm 60 to the fixing member 50 having the second recess 535. The pivot portion 532 of the other fixing member 50 is inserted into a space between the protrusions 712 of the second fixing arm 70. A pin 90 is extended through the first pivot holes 713 and the through hole 533, to rotatably connect the second fixing arm 70 to the other fixing member 50. The pivot arms 80 are respectively placed under the extension arms 63 and 73 of the first and second fixing arms 60 and 70, to allow the through holes 83 to align with the corresponding second pivot holes 635 and 735. Two pins 90 are respectively extended through the second pivot holes 635 and 735 and inserted into the corresponding through holes 83, to rotatably connect the pivot arms 80 respectively to the extension arms 63 and 73. Thereby, the fixing apparatus 10 is assembled.

The first and second tabs 633 and 631 are arranged at an inner side of the first fixing arm 60, which can restrict the pivot arm 80 connected to the first fixing arm 60 to rotate 180 degrees to and fro outside the first and second tabs 633 and 631. The first and second tabs 733 and 731 are arranged at outer side of the second fixing arm 70, which can restrict the pivot arm 80 connected to the second fixing arm 70 to rotate 180 degrees to and fro inside the first and second tabs 733 and 731.

To fix the hard disk drive 20 to the fixing apparatus 10, the latch 40 is rotated to the first recess 332 of the handle 30, to allow the block 336 to engage in the hooking slot 47 of the latch 40. The first and second fixing arms 60 and 70 are respectively rotated to be perpendicular to the sidewall 31 of the handle 30. The stop plates 534 respectively abut against the outer sides of the first and second fixing arms 60 and 70, to prevent the first and second fixing arms 60 and 70 from further rotating outwards. The pivot arms 80 are rotated away from the handle 30, until the first notches 85 of the pivot arms 80 respectively engage with the first tabs 633 and 733 of the corresponding extension arms 63 and 73. Thereby, the pivot arms 80 are respectively unfolded from, and aligned with, the first and second fixing arms 60 and 70. The pivot arms 80 are coplanar with the corresponding extension arms 63 and 73. The hard disk drive 20 is placed between the first and second collapsible arms, to allow the fixing holes 213 of the hard disk drive 20 to align with the corresponding through holes 615 and 715 of the first and second fixing arms 60 and 70 and the corresponding through holes 81 of the pivot arms 80. Four screws 300 are respectively extended through the through holes 615, 715, and 81 and engage in the corresponding fixing holes 213. Thereby, the hard disk drive 20 is mounted to the fixing apparatus 10.

Figure 9:
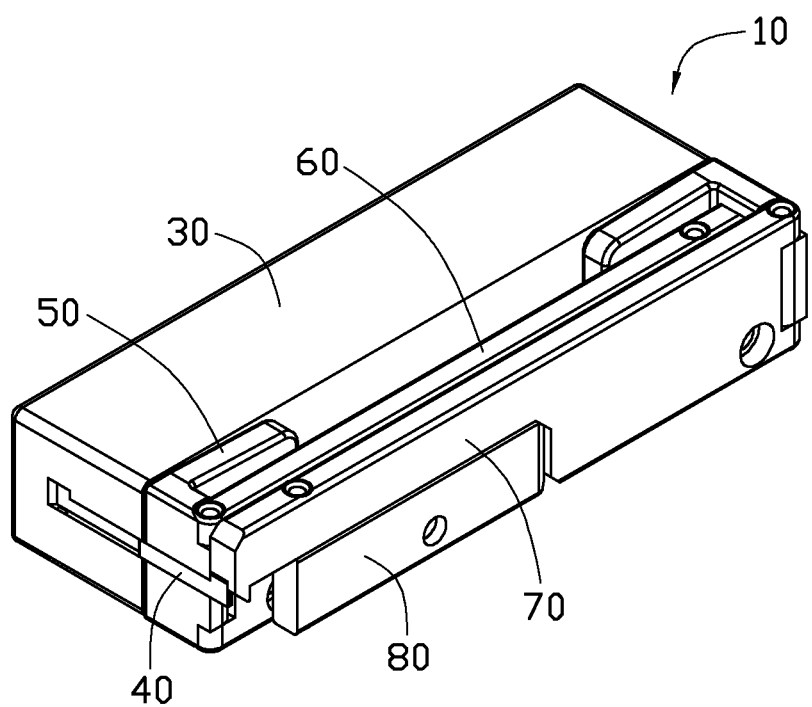
FIG. 9 is an assembled, isometric view of the foldable fixing apparatus, wherein the fixing apparatus is folded.

Referring to FIG. 9, when the fixing apparatus 10 is not in use, the pivot arms 80 are rotated away from the corresponding first tabs 633 and 733, until the pivot arms 80 are received in the corresponding receiving spaces 65 and 75. Then the second notches 87 of the pivot arms 80 respectively engage with the second tabs 631 and 731 of the corresponding extension arms 63 and 73. Thereby, the pivot arms 80 are respectively folded to the first and second fixing arms 60 and 70. The first fixing arm 60 is rotated towards the handle 30, and then the second fixing arm 70 is rotated towards the handle 30, to allow the first and second collapsible arms to be folded to the handle 30. The first collapsible arm is sandwiched between the handle 30 and the second collapsible arm. An operator inserts a finger into the slot 45 and rotates the latch 40 towards the second recess 535 of the corresponding fixing member 50. When the latch 40 is rotated to be received in the second recess 535, the latching portion 48 of the latch 40 engages in the latching slot 734 of the second fixing arm 70. Thereby, the second fixing arm 70 is locked to the handle 30 by the latch 40. The fixing apparatus 10 is folded. The pivot arm 80 connected to the second fixing arm 70 is blocked by the corresponding second tab 731, and cannot be rotated outwards.

In other embodiments, to save money on materials, the fixing members 50 can be omitted. Two pivot portions may directly protrude from opposite ends of the sidewall 31 of the handle 30, and the first and second fixing arms 60 and 70 are respectively rotatably connected to the pivot portions of the handle 30.

Even though numerous characteristics and advantages of the embodiments have been set forth in the foregoing description, together with details of the structure and the functions of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A foldable fixing apparatus for fixing a hard disk drive, the fixing apparatus comprising:

a handle comprising a sidewall;

two collapsible arms each comprising a fixing arm and a pivot arm, wherein first ends of the fixing arms are respectively and rotatably connected to opposite ends of the sidewall, and the pivot arms are respectively and rotatably connected to second ends of the fixing arms opposite to the first ends; and a latch;

wherein when the pivot arms are pivoted to fold to the corresponding fixing arms, the collapsible arms are capable of being folded to the handle; when the fixing arms are rotated to be perpendicular to the sidewall of the handle, and the pivot arms are rotated away from the handle to be unfolded from, and aligned with, the corresponding fixing arms, the hard disk drive is capable of being mounted between the collapsible arms;

wherein the handle further comprises an end wall perpendicular to the sidewall, the latch is pivotably connected to the end wall and adjacent to one of the collapsible arm, when the collapsible arms are folded to the handle, the latch is capable of being rotated to lock the other collapsible arm; and wherein a recess is defined in the end wall, the latch is received in the recess and pivotably connected to an end of the recess adjacent to the sidewall.

2. The foldable fixing apparatus of claim 1, wherein each of the fixing arms is substantially L-shaped, and comprises a main body rotatably connected to the handle, and an extension arm extending from an end of the main body away from the handle, a receiving space is bound by the main body and the extension arm, a distal end of the extension arm away from the handle is the second end of the fixing arm; and first ends of the pivot arms are received in the corresponding receiving spaces and rotatably connected to the distal ends of the corresponding extension arms, and when the pivot arms are rotated to be folded to the corresponding fixing arms, the pivot arms are respectively received in the receiving spaces.

3. The foldable fixing apparatus of claim 2, wherein the distal end of each extension arm forms a tab extending towards the corresponding receiving space, for engaging with the corresponding pivot arm when the pivot arm is unfolded to the corresponding fixing arm.

4. The foldable fixing apparatus of claim 2, wherein when the collapsible arms are folded to the handle, the collapsible arm adjacent to the latch is sandwiched between the handle and the other collapsible arm.

5. The foldable fixing apparatus of claim 1, wherein a latching slot is defined in the second end of the fixing arm of said other collapsible arm, and a latching portion protrudes from a distal end of the latch, for engage with the latching slot of said other collapsible arm.

6. The foldable fixing apparatus of claim 2, wherein an outer side of the extension arm of said other collapsible arm forms a tab adjacent to the corresponding main body and extending towards the corresponding receiving space, for engaging with the corresponding pivot arm when the pivot arm is folded to the fixing arm of said collapsible arm.

7. The foldable fixing apparatus of claim 1, wherein two fixing members are respectively fixed to the opposite ends of the sidewall of the handle, each of the fixing members comprises a fixing portion perpendicular to the sidewall, and a pivot portion protruding from an end of the fixing portion away from the handle, the first ends of the fixing arms are rotatably connected to the pivot portions.

8. The foldable fixing apparatus of claim 7, wherein a through hole is defined in each pivot portion, two spaced protrusions each defining a first pivot hole extend from the first end of each fixing arm, the pivot portions are respectively received between the protrusions of the corresponding fixing arms, two pins are respectively extended through the first pivot holes of the fixing arms and the through holes of the pivot portions, to rotatably connect the fixing arms to the corresponding pivot portions.

9. The foldable fixing apparatus of claim 7, wherein two stop plates respectively extend from top and bottom sides of each pivot portion, for engaging with an outer side of the corresponding fixing arm connected to the pivot portion.

10. A foldable fixing apparatus for fixing a hard disk drive, the fixing apparatus comprising:
a handle comprising a sidewall; and
two collapsible arms each comprising a fixing arm and a pivot arm, wherein first ends of the fixing arms are respectively and rotatably connected to opposite ends of the sidewall, and the pivot arms are respectively and rotatably connected to second ends of the fixing arms opposite to the first ends;
wherein when the pivot arms are pivoted to fold to the corresponding fixing arms, the collapsible arms are capable of being folded to the handle; when the fixing arms are rotated to be perpendicular to the sidewall of the handle, and the pivot arms are rotated away from the handle to be unfolded from, and aligned with, the corresponding fixing arms, the hard disk drive is capable of being mounted between the collapsible arms;
wherein two fixing members are respectively fixed to the opposite ends of the sidewall of the handle, each of the fixing members comprises a fixing portion perpendicular to the sidewall, and a pivot portion protruding from an end of the fixing portion away from the handle, the first ends of the fixing arms are rotatably connected to the pivot portions; and
wherein a through hole is defined in each pivot portion, two spaced protrusions each defining a first pivot hole extend from the first end of each fixing arm, the pivot portions are respectively received between the protrusions of the corresponding fixing arms, two pins are respectively extended through the first pivot holes of the fixing arms and the through holes of the pivot portions, to rotatably connect the fixing arms to the corresponding pivot portions.

11. A foldable fixing apparatus for fixing a hard disk drive, the fixing apparatus comprising:
a handle comprising a sidewall; and
two collapsible arms each comprising a fixing arm and a pivot arm, wherein first ends of the fixing arms are respectively and rotatably connected to opposite ends of the sidewall, and the pivot arms are respectively and rotatably connected to second ends of the fixing arms opposite to the first ends;
wherein when the pivot arms are pivoted to fold to the corresponding fixing arms, the collapsible arms are capable of being folded to the handle; when the fixing arms are rotated to be perpendicular to the sidewall of the handle, and the pivot arms are rotated away from the handle to be unfolded from, and aligned with, the corresponding fixing arms, the hard disk drive is capable of being mounted between the collapsible arms;
wherein two fixing members are respectively fixed to the opposite ends of the sidewall of the handle, each of the fixing members comprises a fixing portion perpendicular to the sidewall, and a pivot portion protruding from an end of the fixing portion away from the handle, the first ends of the fixing arms are rotatably connected to the pivot portions; and
wherein two stop plates respectively extend from top and bottom sides of each pivot portion, for engaging with an outer side of the corresponding fixing arm connected to the pivot portion.

* * * * *